UNITED STATES PATENT OFFICE.

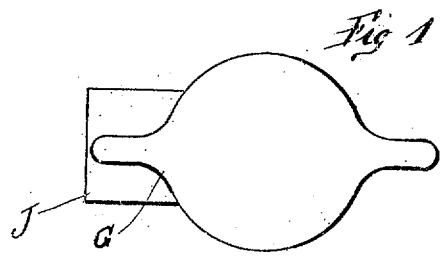
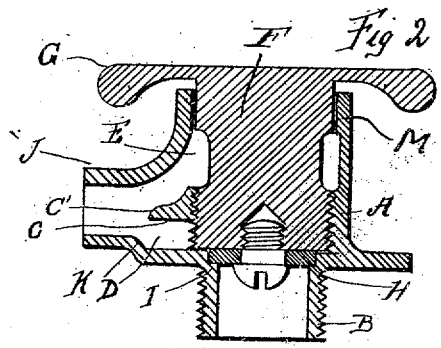
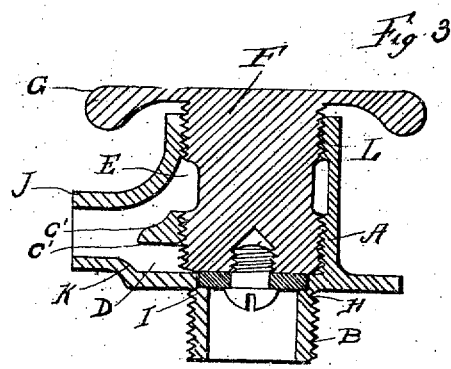

JOHN W. GRANTLAND, OF PHILADELPHIA, PENNSYLVANIA.

FAUCET.

No. 873,538.     Specification of Letters Patent.     Patented Dec. 10, 1907.

Application filed December 28, 1906. Serial No. 349,790.

*To all whom it may concern:*

Be it known that I, JOHN W. GRANTLAND, a citizen of the United States, residing at Philadelphia, county of Philadelphia, and State of Pennsylvania, have invented a certain new and useful Improvement in Faucets, of which the following is a specification.

My invention relates to a new and useful improvement in faucets, and has for its object to provide an exceedingly simple and effective construction by which a faucet may be made of but two parts requiring no packing around the stem, and yet will be absolutely prevented from leaking.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1 is an end elevation of my improved faucet; Fig. 2 is a central section thereof showing the faucet in a closed position. Fig. 3, a similar view of a slightly modified form of the plunger, the latter also being in section.

In carrying out my invention as here embodied, A represents the body or casing of the faucet which has formed therewith the threaded extension B for attachment to the service pipe, and within this casing is cast the diaphragm C leaving a space D upon one side thereof which communicates with the opening in the extension and also a space E upon the opposite side thereof, the latter space being for the purpose set forth.

F represents the plunger the inner end of which is threaded so as to engage the threads of the opening formed through the center of the diaphragm by means of which the plunger is fed up or down by the revolving of the handle G. The upper portion of the plunger is enlarged to approximately fit the opening M in the casing as clearly shown in Fig. 2, while the inner end of the plunger has secured thereon a washer H adapted to seat upon the valve seat I.

The outlet J of the faucet is slightly contracted by the curve K, and in practice the object of this curved portion is to direct the water flowing from the faucet across the projecting edge C' of the diaphragm and this produces a partial vacuum in the space E, the effect of which is to cause a suction in this space when the water is flowing and prevent any leakage around that portion of the plunger loosely fitted in the opening in the casing.

I have found by actual demonstration that but very little water will pass from the space D to the space E around the threaded portion of the plunger, but what little water does escape in this direction will be drawn out at the outlet of the faucet by the suction above described. A portion of the casing wall is sufficiently larger than the stem to form therewith a chamber through which air may pass into the last named space and through which the plunger and valve may be withdrawn. Of course when the faucet is closed the washer H fitting upon the valve seat will prevent any leakage.

It is to be noted that my improved faucet is made of but two castings and does not require any packing, and therefore the cost of manufacture of the ordinary form of faucets is greatly reduced.

In Fig. 3 I have shown a slight modification of my improvement in which both the inner and outer portion of the plunger is threaded, both threads being of the same pitch, and this makes a better fit between the plunger and casing and is more economical to manufacture than the making of a snug fit between the outer portion of the plunger and the casing as shown in Fig. 2, but in both cases the principle remains the same, in that a partial vacuum is created in the space E absolutely preventing any leakage when the faucet is open and the water running.

Of course I do not wish to be limited to its minor details as the same might be varied within certain limits without in any wise departing from the spirit of my invention.

By my invention as described and shown, I have constructed a two-part faucet having a packless relation between the valve stem and the neck of the casing.

Having thus fully described my invention, what I claim as new and useful, is—

A packless faucet consisting of a casing having a diaphragm therein forming two spaces, one space permitting the flow of water when the faucet is open and the other space tending to create a partial vacuum for drawing off any water leaking into the space, a valve and stem mounted in the casing, a portion of the casing wall being sufficiently larger than the stem to form therewith a chamber through which air may pass into the last named space and through which the plunger and valve may be withdrawn.

In testimony whereof, I have hereunto affixed my signature in the presence of two subscribing witnesses.

JOHN W. GRANTLAND.

Witnesses:
H. ROBERT MAYS,
CHAS. G. HAWKINS.